United States Patent
Kim et al.

(10) Patent No.: US 9,871,686 B2
(45) Date of Patent: Jan. 16, 2018

(54) METHOD AND APPARATUS FOR TRANSMITTING AND RECEIVING SIGNAL USING VARIABLE OBSERVATION LENGTH IN MULTICARRIER SYSTEM USING NON-ORTHOGONAL TRANSMISSION SIGNAL

(71) Applicants: Samsung Electronics Co., Ltd., Gyeonggi-do (KR); Postech Academy-Industry Foundation, Gyeongsangbuk-do (KR)

(72) Inventors: Chanhong Kim, Gyeonggi-do (KR); Jubum Kim, Gyeongsangbuk-do (KR); Joon Ho Cho, Gyeongsangbuk-do (KR)

(73) Assignees: SAMSUNG ELECTRONICS CO., LTD., Suwon-si (KR); POSTECH ACADEMY-INDUSTRY FOUNDATION, Pohang-si (KR)

( * ) Notice: Subject to any disclaimer, the term of this patent is extended or adjusted under 35 U.S.C. 154(b) by 0 days.

(21) Appl. No.: 15/069,919

(22) Filed: Mar. 14, 2016

(65) Prior Publication Data
US 2016/0269209 A1 Sep. 15, 2016

(30) Foreign Application Priority Data
Mar. 13, 2015 (KR) ........................ 10-2015-0035218

(51) Int. Cl.
*H04L 5/12* (2006.01)
*H04L 27/26* (2006.01)
(Continued)

(52) U.S. Cl.
CPC ...... *H04L 27/265* (2013.01); *H04L 25/03159* (2013.01); *H04L 27/264* (2013.01); *H04L 27/36* (2013.01)

(58) Field of Classification Search
CPC ............... H04L 27/264; H04L 27/2698; H04L 2025/03414; H04L 27/2601; H04L 27/265;
(Continued)

(56) References Cited

U.S. PATENT DOCUMENTS

2007/0077955 A1* 4/2007 Zhou ................... H04L 1/0025
455/522
2015/0146770 A1* 5/2015 Dore .................. H04L 25/0204
375/232

OTHER PUBLICATIONS

Dommel et al. "5G in space: PHY-layer design for satellite communications using Non-orthogonal Multi-carrier transmission"; 2014 7th advanced multimedia systems conference and the 13th signal processing for space communications workshop,pp. 190-196,Sep. 2014.*

\* cited by examiner

*Primary Examiner* — Rahel Guarino

(57) ABSTRACT

The present disclosure relates to a pre-5th-Generation (5G) or 5G communication system to be provided for supporting higher data rates Beyond 4th-Generation (4G) communication system such as Long Term Evolution (LTE). A method and apparatus for transmitting and receiving signals using a variable observation length in a multi-carrier system using the non-orthogonal transmission signal. A receiver performs fast Fourier transform on reception vectors contained in the signal, equalizes the fast Fourier transformed reception vectors by a 1-tap zero forcing equalizer, and applies a reception filter based on the observation length to the equalized reception vectors. A transmitter includes a transceiver configured to transmit and receive a signal, and a controller configured to cause the transceiver to transmit an indicator for a Modulation and Coding Scheme (MCS) level
(Continued)

to a receiver based on a channel state, and transmit a signal applied with the MCS level to the receiver.

10 Claims, 15 Drawing Sheets

(51) Int. Cl.
*H04L 27/36* (2006.01)
*H04L 25/03* (2006.01)

(58) Field of Classification Search
CPC ............. H04L 27/34; H04L 2025/0342; H04L 25/03159; H04L 27/36
USPC ................................ 375/261, 298, 348, 349
See application file for complete search history.

ZF CHANNEL EQUALIZER w/ OBSERVATION LENGTH 5N (420)
ZF CHANNEL EQUALIZER w/ OBSERVATION LENGTH 3N (410)
ZF CHANNEL EQUALIZER w/ OBSERVATION LENGTH N (400)

SINR MAXIMIZATION FILTER of OBSERVATION LENGTH 5N (520)
SINR MAXIMIZATION FILTER of OBSERVATION LENGTH 3N (510)
SINR MAXIMIZATION FILTER of OBSERVATION LENGTH N (500)

METHOD AND APPARATUS FOR TRANSMITTING AND RECEIVING SIGNAL USING VARIABLE OBSERVATION LENGTH IN MULTICARRIER SYSTEM USING NON-ORTHOGONAL TRANSMISSION SIGNAL

CROSS-REFERENCE TO RELATED APPLICATION AND CLAIM OF PRIORITY

The present application is related to and claims priority from and the benefit under 35 U.S.C. §119(a) of Korean Patent Application No. 10-2015-0035218, filed on Mar. 13, 2015, which is hereby incorporated by reference for all purposes as if fully set forth herein.

TECHNICAL FIELD

The present disclosure relates to a multi-carrier system using a non-orthogonal transmission signal and, more particularly, to a method and apparatus for transmitting and receiving signals using a higher-order quadrature amplitude modulation in a multi-carrier system using the non-orthogonal transmission signal.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A fourth-generation mobile communication system such as 3GPP Long Term Evolution (LTE), and Worldwide Interoperablility for Microwave Access (WiMax), which is currently used, has an Orthogonal Frequency-division Multiplexing (OFDM) scheme based physical layer transmission structure. Further, the OFDM scheme satisfies the need of a user who wants a fast data transmission rate by increasing efficiency of frequency resources using orthogonality of a carrier. However, in the current OFDM scheme, a guard band is required because a large amount of leakage power between frequency bands is generated. To overcome this disadvantage, a Filter Bank Multi Carrier (FBMC) transmission technology has been studied as a physical layer transmission technique for fifth generation mobile communication. The FBMC can obtain high frequency efficiency by reducing the leakage power using a frequency filter, but its implementation is complex.

A Quadrature Amplitude Modulation-FBMC (QAM-FBMC) uses a symbol which does not have orthogonality so that Inter-Symbol Interference (ISI) occurs in the receiver and an accordingly generated amount is very small. Therefore, the amount is insignificant in comparison with a noise when a modulation scheme of a low order is used, but a problem occurs because a noise ratio of an amount of ISI increases when a modulation scheme of a high order is used.

Therefore, a method of resolving a problem of converging (bottlenecking) of the SINR value, which is a weak point of the QAM-FBMC transmission scheme, while maintaining a merit in that a QAM symbol is used and complexity of a transceiver is low.

SUMMARY

As the method of resolving the problem of converging (bottlenecking) of the SINR value, which is the weak point of the QAM-FBMC transmission scheme, there is a method for lengthening an observation length which is a length of information used to estimate a specific symbol. The method of lengthening the observation length has a high efficiency in a high SIR section, but has a disadvantage in that complexity of a receiver increases when the observation length is lengthened. A method of resolving an increase in the complexity of the receiver is required.

To address the above-discussed deficiencies, it is a primary object to provide a method of receiving a signal by a receiver in a filter bank multicarrier system uses a non-orthogonal transmission signal. The method includes: receiving a signal transmitted by a transmitter by applying an observation length, wherein the observation length is variable.

In accordance with another aspect of the present disclosure, there is provided a method of transmitting a signal by a transmitter in a filter bank multicarrier system using a non-orthogonal transmission signal. The method includes transmitting an indicator for a Modulation and Coding Scheme (MCS) level based on a channel state to a receiver; and transmitting a signal applying the MCS level to the receiver.

In accordance with another aspect of the present disclosure, there is provided a receiver for receiving a signal in a filter bank multicarrier system using a non-orthogonal transmission signal. The receiver includes a transceiver for transmitting and receiving a signal, and a controller for making a control to receive the signal transmitted by a transmitter by applying an observation length, wherein the observation length is variable.

In accordance with another aspect of the present disclosure, there is provided a transmitter for transmitting a signal in a filter bank multicarrier system using a non-orthogonal transmission signal. The transmitter includes a transceiver for transmitting and receiving a signal; and a controller for making a control to transmit an indicator for a Modulation and Coding Scheme (MCS) level to a receiver based on a channel state, and to transmit a signal applying the MCS level to the receiver.

In a method of transmitting and receiving a signal by applying a variable observation length according to the embodiment of the present disclosure, the signal can be successfully transmitted and received because high SIR and SINR performances are shown even when high-order modulation is used.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
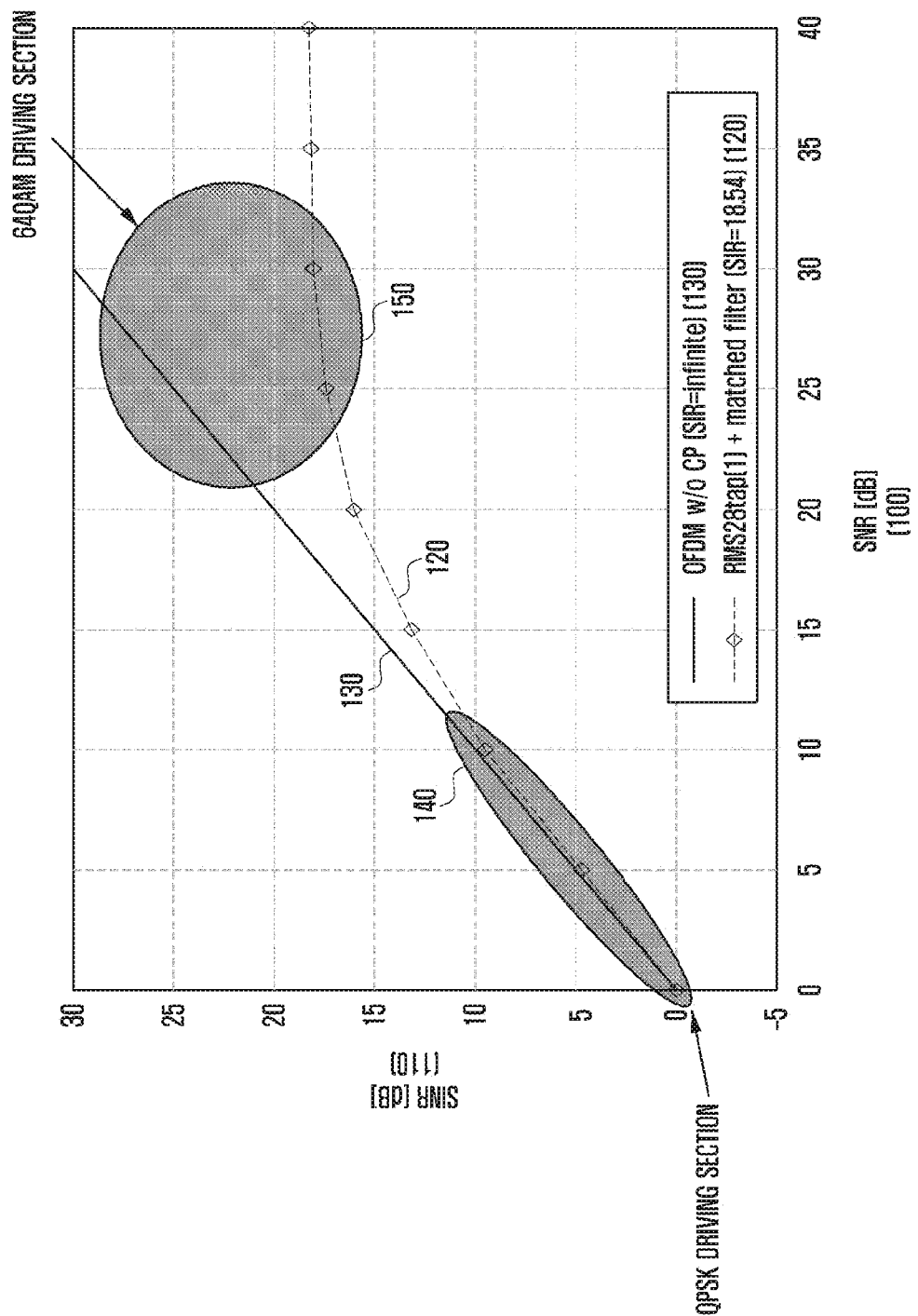
FIG. 1 illustrates SINR performances of an OFDM scheme and a QAM-FBMC transmission technology.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. Hereinafter, embodiments of the present disclosure will be described in detail in conjunction with the accompanying drawings. In the following description of the present disclosure, a detailed description of known functions or configurations incorporated herein will be omitted when it may make the subject matter of the present disclosure rather unclear. The terms which will be described below are terms defined in consideration of the functions in the present disclosure, and may be different according to users, intentions of the users, or customs. Accordingly, the terms should be defined based on the contents over the whole present specification.

Further, the following detailed description of embodiments of the present disclosure is based on the FBMC transmission scheme as a main subject. However, the subject matter of the present disclosure is applicable to other communication systems having similar technical backgrounds and channel formation with small variations without largely departing from the scope of the present disclosure, and the variations may be made by determination of those skilled in the art to which the present disclosure pertains.

The advantages and features of the present disclosure and ways to achieve them will be apparent by making reference to embodiments as described below in detail in conjunction with the accompanying drawings. However, the present disclosure is not limited to the embodiments set forth below, but may be implemented in various different forms. The following embodiments are provided only to completely disclose the present disclosure and inform those skilled in the art of the scope of the present disclosure, and the present disclosure is defined only by the scope of the appended claims. Throughout the specification, the same or like reference numerals designate the same or like elements.

An Offset Quadrature Amplitude Modulation-FBMC (OQAM-FMBC) transmission technology among various schemes of the FBMC transmission technology has a great Signal-to-Interference Ratio (SIR) performance because an OQAM symbol in which orthogonality exists is used. However, complexity of the transceiver is high, compatibility with an existing system is low due to using the OQAM symbols, and application to a Multiple-Input and Multiple-Output (MIMO) system is difficult. In order to overcome this disadvantage, a Quadrature Amplitude Modulation-FBMC (QAM-FMBC) transmission technology may be used, and the QAM-FBMC has high compatibility with the existing system and can be easily extended under the MIMO system because the complexity of the transceiver is relatively low and a QAM symbol is used. However, the QAM-FBMC transmission technology has a low SIR performance in a situation in which there is a high Signal-to-Noise Ratio (SNR).

FIG. 1 illustrates SINR performances of an OFDM scheme and a QAM-FBMC transmission technology. A horizontal axis indicates an SNR 100 (dB unit), and a vertical axis indicates a Signal-to-Interference and Noise Ratio (SINR) 110 (dB unit). A full line 120 indicates an SINR performance when the OFDM scheme is used according to an SNR and a dashed line 130 indicates an SINR performance when a QAM-FBMC transmission technology is used.

According to FIG. 1, the OFDM and QAM-FBMC transmission schemes indicate similar SINR performances in a low SNR area 140 which can use a QPSK scheme. That is, in a case in which the OFDM is used or the QAM-FBMC is used when a low-order modulation scheme is used, there is no difference in the SINR performance. However, although the SINR performance increases in proportion to an SNR performance in a case in which the OFDM scheme is used when the SNR performance increases, the SINR performance is converged even if the SNR increases when the QAM-FBMC transmission scheme is used. In particular, a much higher SNR performance is shown in a case, in which the OFDM scheme is used in a high SNR area 150 in which the 64QAM scheme can be used, in comparison with a case in which the QAM-FBMC is used.

Specifically, when an overlapping factor is 4, FD localization is considered, and a low-order modulation scheme such as a QPSK is applied around 15-20 dB, the QAM-FBMC transmission scheme is operated without a problem in the performance. However, when a high-order modulation scheme such as the 64QM is applied because the SNR increases, the SIR performance becomes stagnant.

TABLE 1

| SNR (dB) | SIR (dB) | SINR (dB) |
|---|---|---|
| 25 | 20 | 18.8067 |
|  | 60 | 24.9986 |

Table 1 shows an SNR performance according to a SIR performance in a case in which the SNR performance is same when the QAM-FBMC transmission scheme is used. The SINR is 18.8067 dB when the SIR is 20 dB, and the SINR is 24.9986 dB when the SIR is 60 dB. Accordingly, the SINR value may not be largely changed in comparison with the change of the SIR value.

The QAM-FBMC uses a symbol which does not have orthogonality so that Inter-Symbol Interference (ISI) occurs in the receiver and an accordingly generated amount is very small. Therefore, the amount is insignificant in comparison with a noise when a modulation scheme of a low order is used, but a problem occurs because a noise ratio of an amount of ISI increases when a modulation scheme of a high order is used.

Therefore, a method of resolving a problem of converging (bottlenecking) of the SINR value, which is a weak point of the QAM-FBMC transmission scheme, while maintaining a merit in that a QAM symbol is used and complexity of a transceiver is low.

Figure 2:
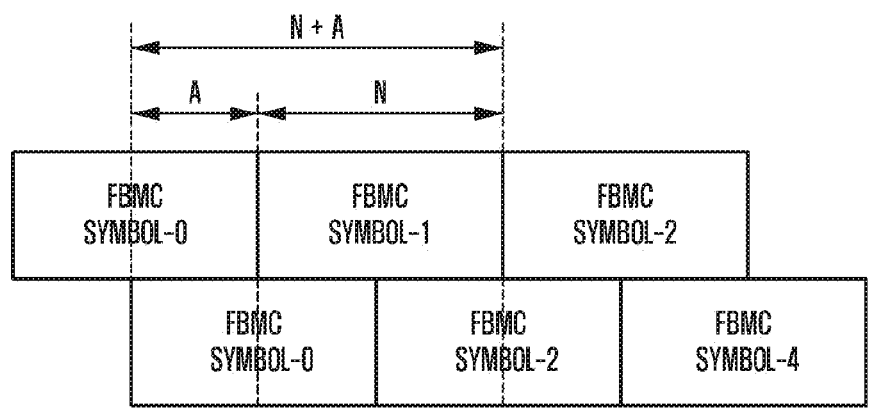
FIG. 2 illustrates an observation length according to embodiments of the present disclosure.

FIG. 2 illustrates an observation length according to embodiments of the present disclosure. An observation length refers to a length of information used to estimate a specific symbol. Referring to FIG. 2, when an overlapping factor L is 2, a plurality of FBMC symbols are overlapped with each other as shown in FIG. 2. In a QAM-FBMC using a non-orthogonal transmission signal, the FBMC symbols are overlapped and there is no orthogonality between the symbols so that the FBMC symbols have a correlation each other. In this event, it is general that an observation length of N is used to estimate an FBMC symbol 1 200, but the observation length becomes N+A when an observation value 210 of a length of A is additionally used to estimate the FBMC symbol 1.

When the observation length is lengthened, communication efficiency increases, and especially, high communication efficiency is shown in a section in which an SNR is high, but the complexity of the receiver largely increases. Therefore, when the receiver uses the variable observation length, the receiver can efficiently receive a signal transmitted by the transmitter in various communication environments. However, since complexity significantly increases in comparison with an efficiency increase in a case in which the observation length is lengthened when using the existing equalizer, the receiver could not receive a signal by lengthening the observation length.

The present disclosure provides a new equalizer structure, and can apply a receiver and a reception method, which apply the variable observation length, to the QAM-FBMC system because the complexity does not significantly increase even though the observation length is lengthened when the equalizer of the present disclosure is applied. The equalizer provided in the present disclosure has characteristics in that the observation length can be extended as every integer multiple of the symbol length of N, a reception performance increases as the observation length increases, and a size of Fast Fourier Transform (FFT) is constant as N without the observation length.

Figure 3:
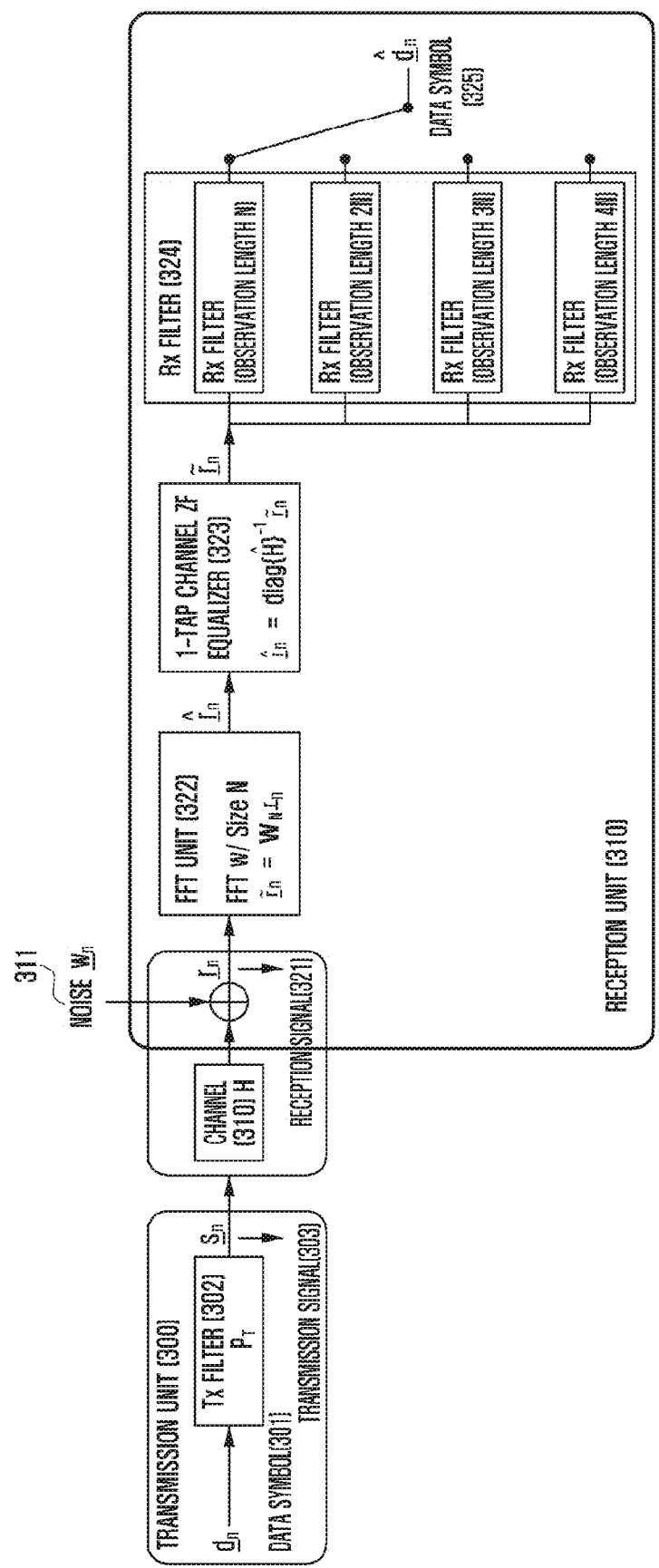
FIG. 3 is a block diagram illustrating a transceiver including an equalizer which can apply a variable observation length according to embodiments of the present disclosure.

FIG. 3 is a block diagram illustrating a transceiver including an equalizer which can apply a variable observation length.

In FIG. 3, a transmission unit 300, a channel 310, and a reception unit 320 are included. In the transmission unit, a data symbol $d_n$ 300 is converted in to a transmission signal $s_n$ 303 through a transmission filter $P_T$ 302 and transmitted. The transmission signal is received by the reception unit in the form of a reception signal $r_n$ 321 by adding a noise $w_n$ 311 through a channel H 310. The received reception signal is FFTed in an FFT unit 322, and is equalized in a 1 tap channel Zero Forcing (ZF) equalizer 323. The equalized reception signal $\widetilde{r_n}$ is again converted into a data symbol $\widehat{d_n}$ 325 through a reception filter 324. In this event, the equalized reception signal passes through a corresponding reception filter as an observation length is changed to N, 2N, 3N, and 4N.

An equalizer structure provided by the present disclosure is as follows.

When an FBMC symbol length is N and an observation length is 3N, a reception signal model in a frequency band (domain) is shown in Equation 1 below.

$$\hat{\underline{y}}_{-L} = \quad \text{[Equation 1]}$$

$$\hat{H}P\underline{d}_{-L} + \hat{H}\sum_{i=-L+1, i\neq 0}^{L-1} P_i\underline{d}_{i-L} + \hat{H}_{N_{ch}}\sum_{i=-L+1}^{-1} P_{i,N_{ch}}\underline{d}_{i-L} + \hat{\underline{\omega}}$$

$$\hat{\underline{y}}_0 = \hat{H}P\underline{d}_0 + \hat{H}\sum_{i=-L+1, i\neq 0}^{L-1} P_i\underline{d}_i + \hat{H}_{N_{ch}}\sum_{i=-L+1}^{-1} P_{i,N_{ch}}\underline{d}_i + \hat{\underline{\omega}}$$

$$\hat{\underline{y}}_L = \hat{H}P\underline{d}_L + \hat{H}\sum_{i=-L+1, i\neq 0}^{L-1} P_i\underline{d}_{i+L} + \hat{H}_{N_{ch}}\sum_{i=-L+1}^{-1} P_{i,N_{ch}}\underline{d}_{i+L} + \hat{\underline{\omega}}$$

$\hat{\underline{y}}$ refers to a reception signal, P refers to a transmission filter, $\hat{H}$ refers to a channel, $\underline{d}$ refers to a data symbol, $P_i$ refers to Inter-Symbol Interference (ISI), $\widehat{H_{N_{ch}}}$ refers to an additional channel, and $P_{i,N_{ch}}$ refers to an additional ISI signal by the channel.

In this event, a Linear Minimum Mean Square Error (LMMSE) equalizer satisfies Equation 2 below.

$$\underset{G_{-1}, G_0, G_1}{\text{minimize}} E\left[\| G_{-1}\hat{\underline{y}}_{-L} + G_0\hat{\underline{y}}_0 + G_1\hat{\underline{y}}_L - \underline{d}_0\|^2\right] \quad \text{[Equation 2]}$$

The present disclosure provides an equalizer as shown in Equation 3 for satisfying Equation 2.

$$[G_{-1}\ G_0\ G_1] \approx [0\ P^{\mathcal{H}}\ 0] \quad \text{[Equation 3]}$$

$$\left(\begin{bmatrix} X & Y^{\mathcal{H}} & 0 \\ Y & X & Y^{\mathcal{H}} \\ 0 & Y & X \end{bmatrix} + \sigma^2 I_{3N}\right)^{-1} \begin{bmatrix} \hat{H} & 0 & 0 \\ 0 & \hat{H} & 0 \\ 0 & 0 & \hat{H} \end{bmatrix}^{-1},$$

$$X = \left(PP^{\mathcal{H}} + \sum_{i=-L+1, i\neq 0}^{L-1} P_i P_i^{\mathcal{H}}\right)$$

$$Y = \left(\sum_{i=-L+1}^{-1} P_i P_{i+L}^{\mathcal{H}}\right)$$

The present disclosure includes an equalizer which is divided into two parts, and in Equation 3, $$[0\ P^{\mathcal{H}}\ 0]\left(\begin{bmatrix} X & Y^{\mathcal{H}} & 0 \\ Y & X & Y^{\mathcal{H}} \\ 0 & Y & X \end{bmatrix} + \sigma^2 I_{3N}\right)^{-1}$$

refers to a reception filter for maximizing a SINR when the observation length is 3N, and $$\begin{bmatrix} \hat{H} & 0 & 0 \\ 0 & \hat{H} & 0 \\ 0 & 0 & \hat{H} \end{bmatrix}^{-1}$$

refers to a channel ZF equalizer. The channel ZF equalizer can be expressed as $$\text{diag}\left\{\frac{1}{\hat{h}_0}, \cdots, \frac{1}{\hat{h}_{N-1}}, \frac{1}{\hat{h}_0}, \cdots, \frac{1}{\hat{h}_{N-1}}, \frac{1}{\hat{h}_0}, \cdots, \frac{1}{\hat{h}_{N-1}}\right\}.$$

The channel ZF equalizer corresponds to a channel equalizer which is well known in the prior art, is used by being approximated by a diagonal matrix. In the present disclosure the channel ZF equalizer can be generalized as an integer multiple of the general observation length of N.

Figure 4:
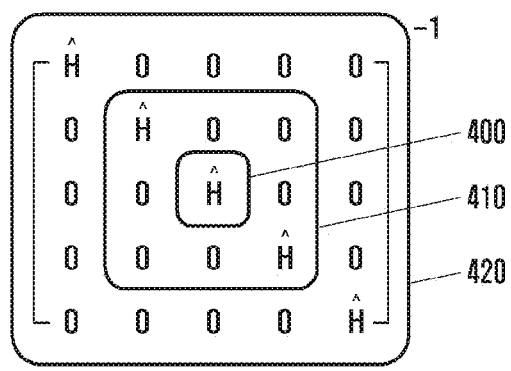
FIG. 4 illustrates a case in which a channel ZF equalizer is generalized by an integer multiple of a general observation length of N according to embodiments of the present disclosure.

FIG. 4 illustrates a case in which a channel ZF equalizer is generalized by an integer multiple of a general observation length of N.

Referring to FIG. 4, a matrix 400 can be used when an observation length is N, a matrix 410 can be used when the observation length is 3N, and a matrix 420 can be used when the observation length is 5N. In FIG. 4, although only a case, in which the observation lengths are N, 3N, and 5N, has been described, a channel ZF equalizer, in which general integer multiples of N is approximated by a diagonal matrix, can be calculated.

A reception filter for maximizing the SINR corresponds to a filter for maximizing the SINR in the same channel environment, and can be obtained from a QAM-FBMC reception vector model of an additive white Gaussian noise channel when the observation length is N. The n-th reception $\underline{r}_n$ signal and a data symbol $\widehat{\underline{x}_n}$ in the additive white Gaussian noise channel can be expressed as follows.

$$\underline{r}_n = P_T \underline{x}_n + \sum_{k \neq n} I_{T,k} \underline{x}_k + \underline{w}_n, \quad \text{[Equation 4]}$$

$$\hat{\underline{x}}_n = P_R \underline{r}_n$$

where $P_T$ refers to a transmission filter, $I_T$ refers to Inter-Symbol Interference (ISI), and $\underline{w}_n$ refers to the n-th noise signal. In this event, there can be an optimized problem as shown in Equation 5.

For given $P_{T,\sigma}^2$ minimize MSE $P_R$=minimize $E[\|\underline{x}_n - \widehat{\underline{x}_n}\|^2]$ [Equation 5]

A solution which can solve this problem is the same as Equation 6 below and the solution is a reception filter for maximizing the SINR with respect to the given SNR.

Reception filter = [Equation 6]

$$P_R = E[\underline{x}\underline{r}^H]E[\underline{r}\underline{r}^H]^{-1} = P_T^H\left(P_T P_T^H + \sum_{k \neq n} I_{T,k} I_{T,k}^H + \sigma^2 I\right)$$

where σ can be expressed as power of a noise related to the SNR when a size of a signal is normalized as 1, and the SNR can be expressed as $$\frac{1}{\sigma^2}.$$

Figure 5:
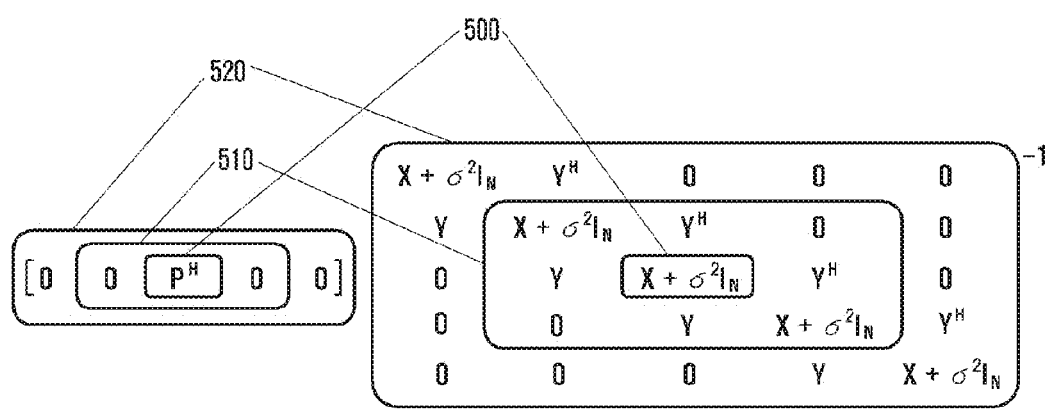
FIG. 5 illustrates a generalized SINR maximization filter when an observation length is lengthened according to embodiments of the present disclosure.

FIG. 5 illustrates a generalized SINR maximization filter when an observation length is lengthened.

Referring to FIG. 5, a matrix 500 can be used when an observation length is N, a matrix 510 can be used in the observation length is 3N, and a matrix 520 can be used when the observation length is 5N. In FIG. 5, although only a case in which the observation lengths are N, 3N, and 5N has been described, a channel ZF equalizer, in which general integer multiples of N are approximated by a diagonal matrix, can be calculated. In this event, X and Y are as follows in Equation 7.

$$X = \left( PP^{\mathcal{H}} + \sum_{i=-L+1, i\neq 0}^{L-1} P_i P_i^{\mathcal{H}} \right) \quad \text{[Equation 7]}$$

$$Y = \left( \sum_{i=-L+1}^{-1} P_i P_{i+L}^{\mathcal{H}} \right)$$

A reception algorithm provided by the present disclosure will be described in more detail below.

Figure 6:
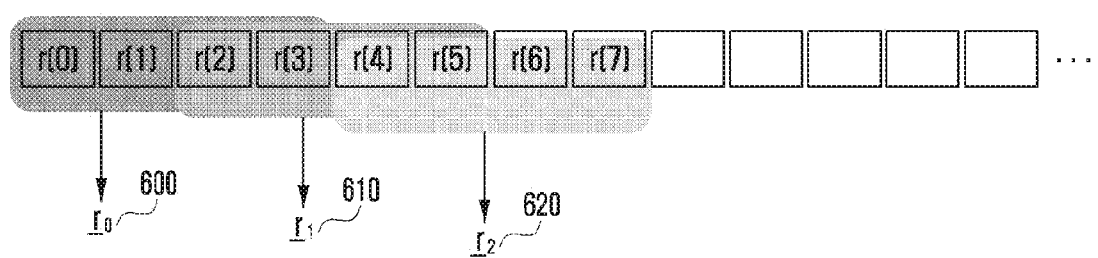
FIG. 6 illustrates a relationship between a reception signal vector and a sequence according to embodiments of the present disclosure.

FIG. 6 illustrates a relationship between a reception signal vector and a sequence. Referring to FIG. 6, when a reception signal sequentially received by a receiver is expressed as sequence $r[k]_k^\infty = -\infty$, if an overlapping factor L is 2 and the number M of sub-carriers or streams is 2, a symbol length of N can be expressed as L×M. In this event, N=4. A symbol number $\underline{r_0}$ 600 of the reception signal vector includes sequences r[0], r[1], r[2], and r[3], $\underline{r_1}$ 610 includes sequences [2], r[3], r[4], and r[5], and $\underline{r_2}$ 620 includes sequences r[4], r[5], r[6], and r[7].

Figure 7:
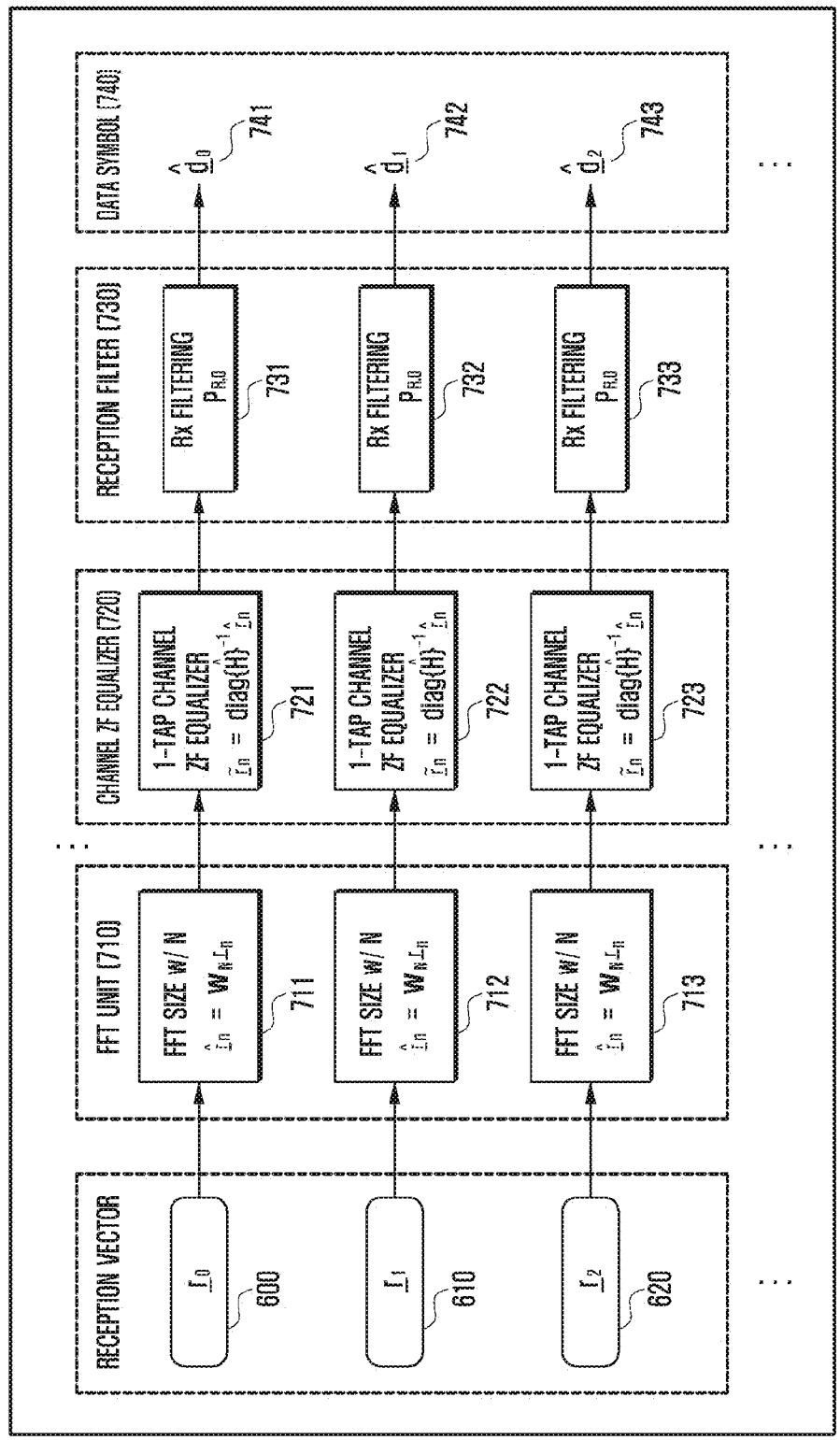
FIG. 7 illustrates a signal processing method of a reception unit in a case in which an observation length of N is applied and filtered when a reception signal vector length is N according to embodiments of the present disclosure.

FIG. 7 illustrates a signal processing method of a reception unit in a case in which an observation length N is applied and filtered when a reception signal vector length (this can be understood as a symbol length) is N.

Referring to FIG. 7, a reception signal vector of the length of N is converted to a data symbol through each of an FFT, a channel ZF equalizer, and a reception filter. Specifically, a reception signal vector $\underline{r_0}$ 600 is FFTed ($\widehat{r_n} = W_N \hat{h}$), as indicated by reference numeral 711, in an FFT unit 710, is equalized ($\widetilde{r_n} = \text{diag}\{\hat{H}\}^{-1} \widehat{r_n}$), as indicated by reference numeral 721, in a channel ZF equalizer 720, passes through reception filtering $P_{R,O}$ in a reception filter 730, and then is converted into a data symbol $\widehat{d_0}$ 741. $\underline{r_1}$ 610 and $\underline{r_2}$ 620 after the reception signal vector $\underline{r_0}$ also pass through the same process.

Figure 8:
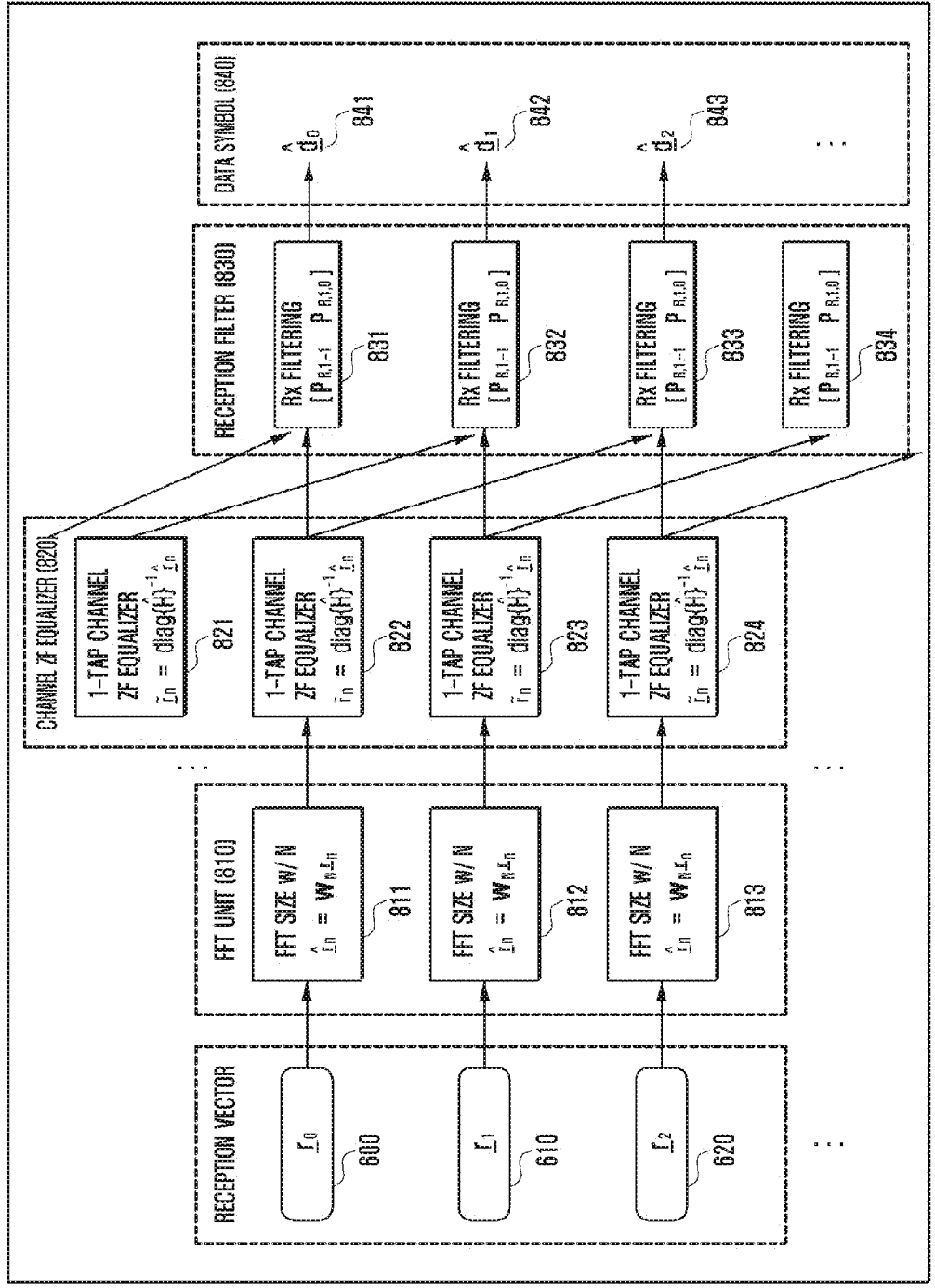
FIG. 8 illustrates a signal processing method of a reception unit in a case in which an observation length of 2N is applied and filtered when a reception signal vector length is N according to embodiments of the present disclosure.

FIG. 8 illustrates a signal processing method of a reception unit in a case in which an observation length of 2N is applied and filtered when a reception signal vector length is N.

Referring to FIG. 8, although reception signal vectors of the length of N is converted to data symbols through each of an FFT, a channel ZF equalizer, and a reception filter as shown in the method of FIG. 7, the processing method of the reception filter allows to be different from a processing method of the conventional reception filter. Specifically, a reception signal vector $\underline{r_1}$ 610 is FFTed, as indicated by reference numeral 812, in an FFT unit 810 and is equalized, as indicated by reference numeral 823, in a channel ZF equalizer 820. The reception signal vector $\underline{r_1}$ equalized by the channel ZF equalizer is filtered in a reception filter 830, and a filter $[P_{R,1,-1} P_{R,1,0}]$ 833 is applied to the equalized reception signal vector $\underline{r_1}$ together with the reception signal vector which passes through the channel ZF equalization 821. That is, the reception signal vector is the FFTed and channel ZF equalized in a unit of a reception signal vector length of N, but is converted to a data symbol $\widehat{d_1}$ 842 by being filtered with a signal vector (length of N) firstly received in the reception filter. Therefore, the receiver receives a signal using two reception signal vectors. A reception signal vector $\underline{r_2}$ 620, which passes through FFT 813 and channel ZF equalization 824, is filtered, as indicated by reference numeral 833, in the reception filter together with the $\underline{r_0}$ 600, which passes through the FFT 811 and the channel ZF equalization 822.

Figure 9:
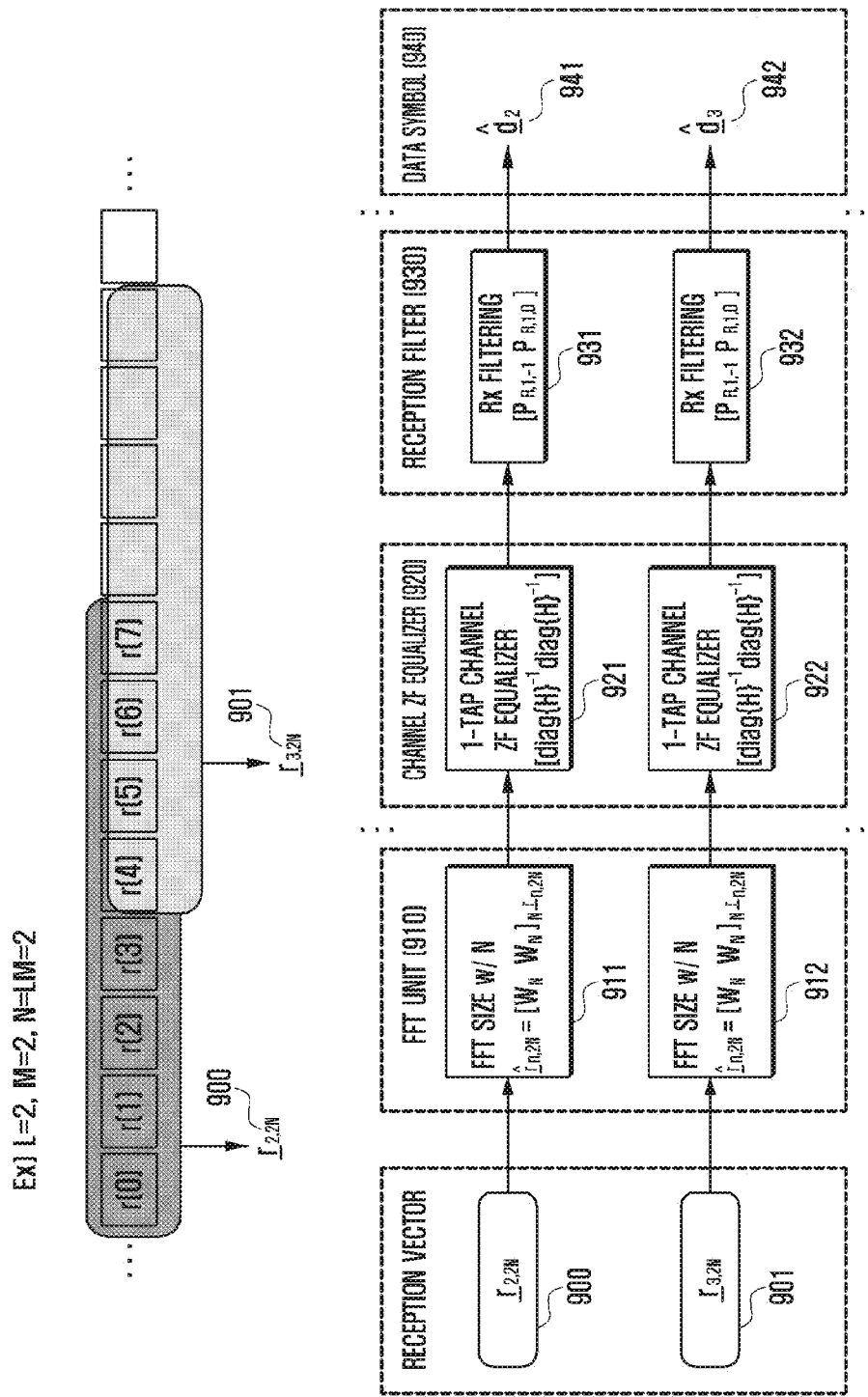
FIG. 9 illustrates a signal processing method of a reception unit differently interpreting a case in which an observation length of 2N is applied and filtered according to embodiments of the present disclosure.

FIG. 9 illustrates a signal processing method of a reception unit differently interpreting a case in which an observation length of 2N is applied and filtered.

Referring to FIG. 9, a reception signal vector $\underline{r_{2,2N}}$ 900 includes sequence r[0], r[1], r[2], r[3], r[4], r[5], r[6], and r[7], a reception signal vector $\underline{r_{3,2N}}$ 901 includes sequence r[4], r[5], r[6], r[7], r[8], r[9], r[10], and r[11], and lengths of reception signal vectors $\underline{r_{2,2N}}$ and $\underline{r_{3,2N}}$ are 2N.

In this event, the reception signal vector $\underline{r_{2,2N}}$ is FFTed, as indicated by reference numeral 911, in an FFT unit 910, is equalized, as indicated by reference numeral 921, in a channel ZF equalizer 920, and is filtered, as indicated by reference numeral 931, in a reception filter 930, and then is converted to a data symbol $\widehat{d_2}$ 941. There is a difference in that the FFT unit and channel ZF equalizer processes a reception signal vector of 2N size unlike FIG. 8, and the reception filter does not filter two reception signal vectors which are equalized respectively as shown in FIG. 8, but filters a reception signal vector of a length of 2N, which is equalized together, to covert the filtered reception signal vector to a data symbol.

Figure 10:
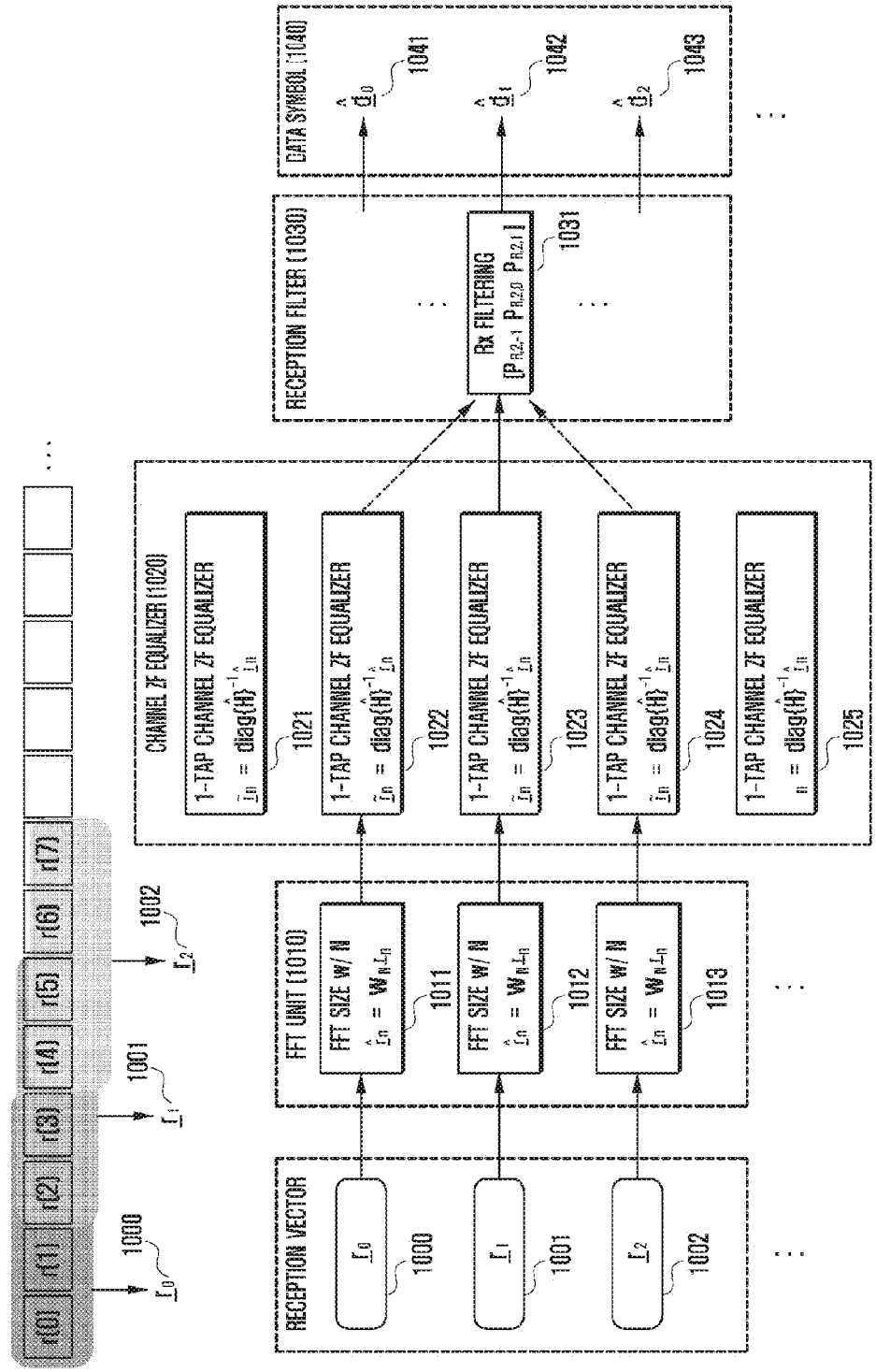
FIG. 10 illustrates a signal processing method of a reception unit in a case in which an observation length of 3N is applied and filtered when a reception signal vector length is N according to embodiments of the present disclosure.

FIG. 10 illustrates a signal processing method of a reception unit in a case in which an observation length of 3N is applied and filtered when a reception signal vector length is N.

Referring to FIG. 10, a reception signal vector $\underline{r_0}$ 1000 includes sequence r[0], r[1], r[2], and r[3], a reception signal vector $\underline{r_1}$ 1001 includes sequence r[2], r[3], r[4], and r[5], and a reception signal vector $\underline{r_2}$ 1002 includes sequence r[4], r[5], r[6], and r[7]. The reception signal vector $\underline{r_1}$ is FFTed, as indicated by reference numeral 1012, in an FFT unit 1010, is equalized, as indicated by reference numeral 1023, in a channel ZF equalization 1020, and is filtered ($[P_{R,2,-1} P_{R,2,0} P_{R,2,1}]$), as indicated by reference numeral 1031, in a reception filter 1030. In this event, when the reception filter filters the reception signal vector $\underline{r_1}$, a reception signal vector which is equalized, as indicated by reference numeral 1021, in the channel ZF equalizer is filtered together with a reception signal which is equalized, as indicated by reference numeral 1025. That is, the reception signal vector is FFTed and channel ZF equalized in a unit of a reception signal vector length of N, but a signal vector (length of N) firstly received from the reception filter is filtered together with a signal vector (length of N) received later from the reception filter to be converted to a data symbol $\widehat{d_1}$ 1042. Therefore, the receiver receives a signal using three reception signal vectors.

Figure 11:
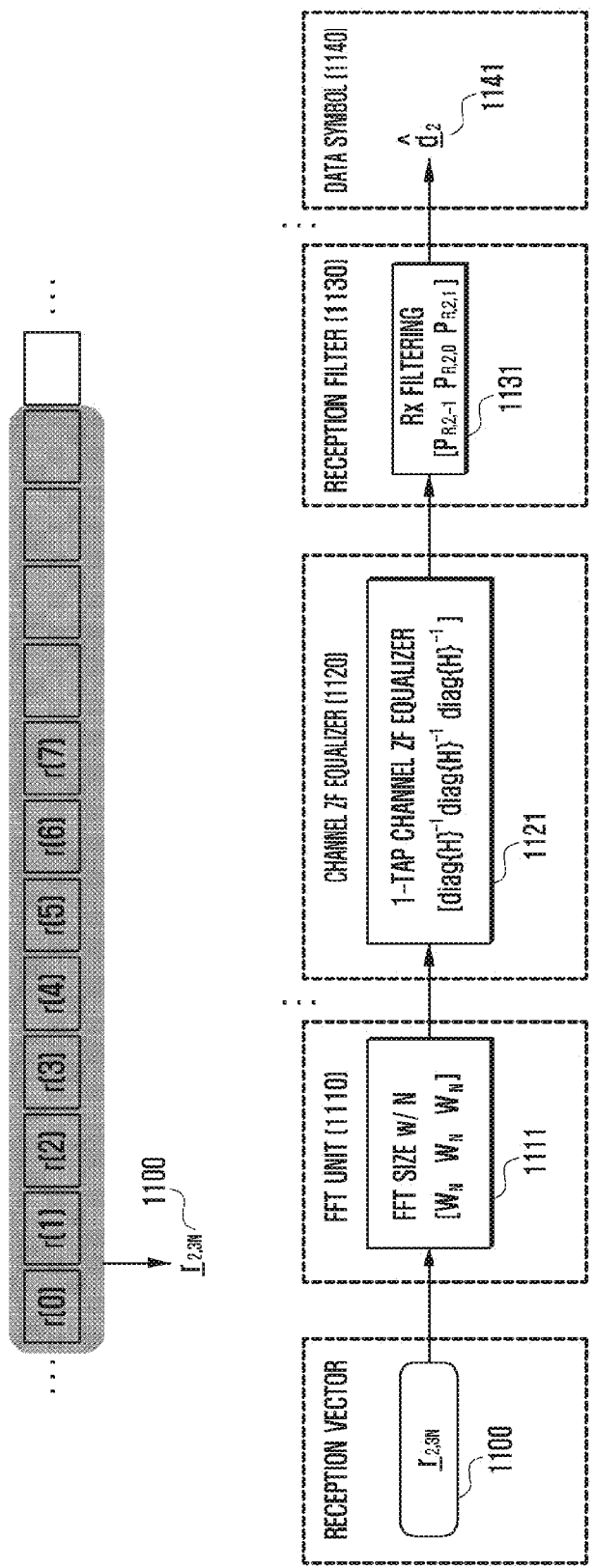
FIG. 11 illustrates a signal processing method of a reception unit differently interpreting a case in which an observation length of 3N is applied and filtered according to embodiments of the present disclosure.

FIG. 11 illustrates a signal processing method of a reception unit differently interpreting a case in which an observation length of 3N is applied and filtered.

Referring to FIG. 11, a reception signal vector $\underline{r_{2,3N}}$ 1900 includes sequence r[0], r[1], r[2], r[3], r[4], r[5], r[6], r[7], r[8], r[9], r[10], and r[11], and a length of the reception signal vector $\underline{r_{2,3N}}$ is 3N.

In this event, the reception signal vector $\underline{r_{2,3N}}$ is FFTed, as indicated by reference numeral 1111, in an FFT unit 1110, is channel ZF equalized, as indicated by reference numeral 1121, in a channel ZF equalizer 1120, and is filtered, as indicated by reference numeral 1131, in a reception filter 1130 to be converted to a data symbol $\widehat{d_2}$ 1141. There is a difference in that the FFT unit and channel ZF equalizer process a reception signal vector of a 3N size unlike FIG. 10, and the reception filter does not filter three reception signal vectors which are equalized respectively as shown in FIG. 10, but filters a reception signal vector of a length of 3N, which is equalized together, to covert the filtered reception signal vector to a data symbol.

Figure 12:
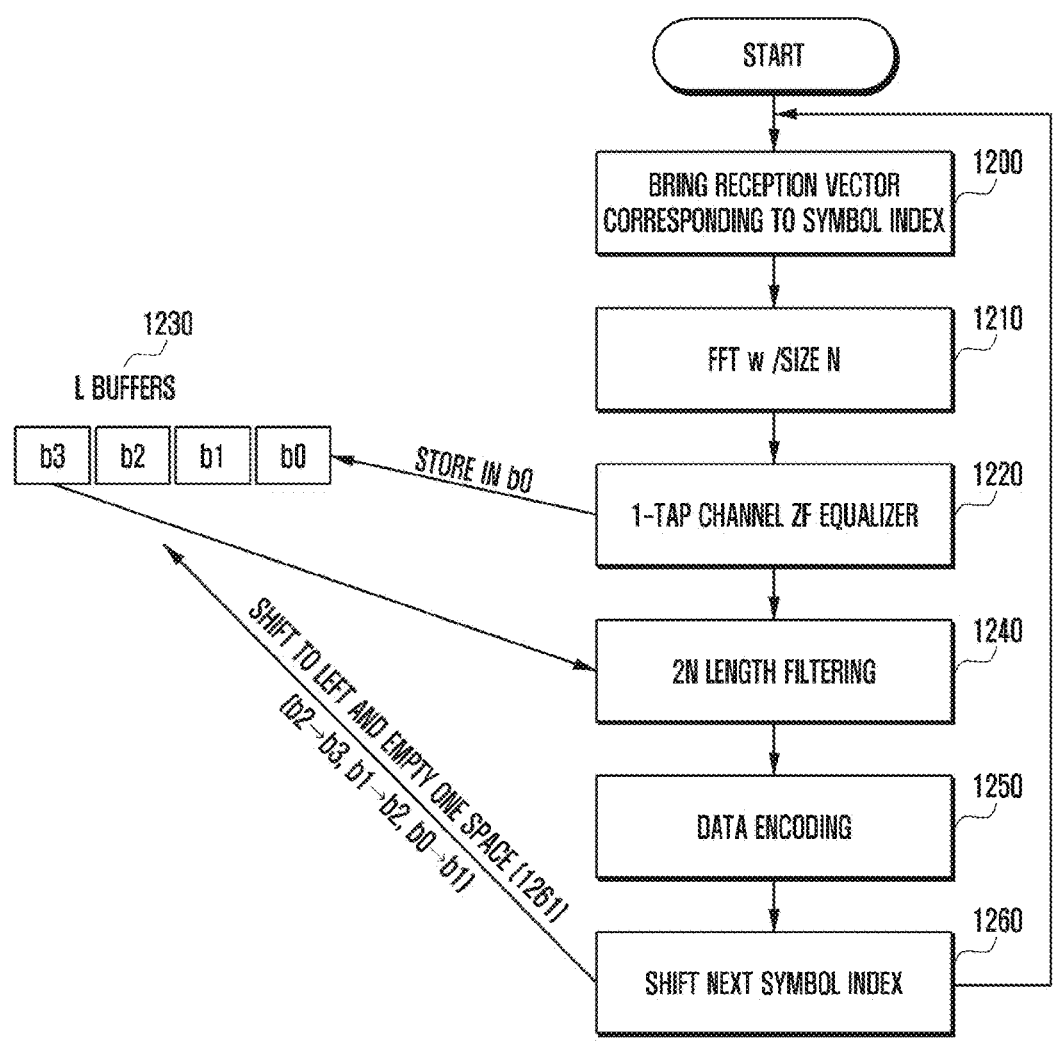
FIG. 12 is a flowchart illustrating a case in which a reception unit receives a signal by an observation length of 2N according to embodiments of the present disclosure.

FIG. 12 is a flowchart illustrating a case in which a receiver receives a signal as an observation length of 2N.

Referring to FIG. 12, the receiver has, as indicated by reference numeral 1230, L buffers and brings, as indicated by reference numeral 1200, a reception signal vector received in accordance with a symbol index. The receiver performs, as indicated by reference numeral 1210, an FFT in a size of N on a target of the reception signal vector and then performs, as indicated by reference numeral 1220, a 1-tap ZF channel equalization. In this event, the receiver performs equalization and stores, as indicated by reference numeral 1221, a reception signal vector, which has been equalized, in a buffer b0. The receiver brings a reception signal vector, which was stored in a buffer b3 and has been equalized, performs, as indicated by reference numeral 1240, filtering of a length of 2N, and encodes, as indicated by reference numeral 1250, data. The receiver which has passed through these processes shifts, as indicated by reference numeral 1260, to a next symbol index, and left shifts, as indicated by reference numeral 1261, information of a buffer one by one and empties one space. That is, information in a buffer b2 is stored in the buffer b3, information in a buffer b1 is stored in the buffer b2, and information in a buffer b0 is stored in the buffer b1.

In the present disclosure, although an example, in which a firstly received reception signal vector is used when the observation length is 2N, has been described, a content of the present disclosure can be applied without any difference even if a lately received reception signal vector is used. However, when an observation length of an odd multiple such as 3N and 5N is used, the highest reception performance is shown in that a lengthened observation length is observed to be symmetrical with reference to an FBMC symbol from which a data symbol is obtained. When the observation length is an even multiple, such as 4N, of the symbol length, the performance can be optimized by observing the symbols as symmetrically as possible, like symbols including two forward symbols, one backward symbol or one forward symbol, and two backward symbols with reference to an FBMC symbol from which a data symbol is to be obtained.

Further, when the observation length is lengthened, since in 1, 2, . . . , L−1 th forward or backward symbols, a currently observed reception signal vector is overlapped with information which can be obtained, the present disclosure provides that the L-th forward symbol or the L-th backward symbol is observed together with original symbol. When the observation length is fixed, in a case in which the L-th forward symbol or the L-th backward symbol are observed, the most numerous pieces of information can be obtained.

Figure 13:
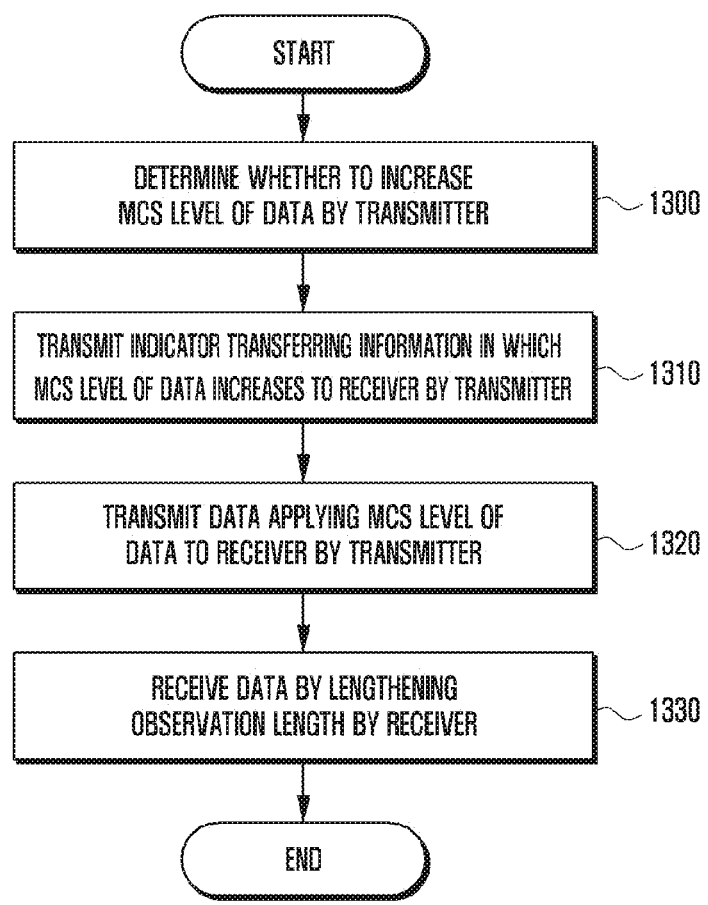
FIG. 13 illustrates an example of an operation scheme of a transceiver including an equalizer supporting a variable observation length according to embodiments of the present disclosure.

FIG. 13 illustrates an example of an operation scheme of a transceiver including an equalizer supporting a variable observation length.

Referring to FIG. 13, a transmitter determines whether a Modulation and Coding Scheme (MCS) level of transmitted data increases in step 1300. Even though the MCS level of data is determined in accordance with a channel status, complexity of a receiver can further increase when there is enough time in a delay time (latency) of a signal process or there is enough power. The transmitter can apply the present operation scheme to all kinds of signals as well as data. When it is determined that the MCS level of data increases, the transmitter transmits an indicator which transfers information in which the MCS level of data increases to the receiver in step 1310. The indicator can transmit channel state information which can indicate a specific MSC level and indicate a channel status which is better than an actual channel status. The transmitter transmits data applying the MCS level notified to the receiver to the receiver in step 1320. The receiver receives data transmitted by the transmitter by lengthening an observation length in step 1330.

TABLE 2

| Existing MCS level | 1 bit indicator | Actually used MCS level | Modulation order | Coding rate | Observation length | Reception filter |
|---|---|---|---|---|---|---|
| 0 | 0 | 0 | QPSK | 1/2 | N | $P_{R, 0, 0}$ |
|   | 1 | 1 | 16QAM | 1/2 | 3N | $[P_{R, 1, 1, -1} P_{R, 1, 1, 0} P_{R, 1, 1, 1}]$ |
| 1 | 0 | 1 | 16QAM | 1/2 | N | $P_{R, 0, 1}$ |
|   | 1 | 2 | 16QAM | 3/4 | 3N | $[P_{R, 1, 2, -1} P_{R, 1, 2, 0} P_{R, 1, 2, 1}]$ |

Table 2 is an example of an operation scheme in which a transceiver including an equalizer supporting a variable observation length notifies of a change of the MCS level to the indicator. When the transmitter instructs to raise the MCS level by 1 bit to the receiver, an MCS level used to transmit actual data according to an indicator based on the existing MCS level is determined, thereby determining an observation length of the receiver and the reception filter. In the reception filter P_R, i, j, k, i refers to a content of an indicator of 1 bit, j refers to an actually used MCS level, k refers to an index value of a reception signal vector when a reception signal vector (hereinafter, a reference reception signal vector) corresponding to a data symbol acquired through filtering of the filtered reception signal vector is 0. When k=0, this implies that k is fixed to 0 when i=0 from the start point of a decoded symbol. Therefore, when i=1, 0 among the values of k refers to a reception filter for a reference reception signal vector, −1 refers to a reception vector having a length of N of a section of (−N to 0) before a reference reception signal vector start point, and 1 refers to a reception filter for a reception signal vector having a length of N of a section of (N+1 to 2N) after a reference reception signal vector start point.

Figure 14:
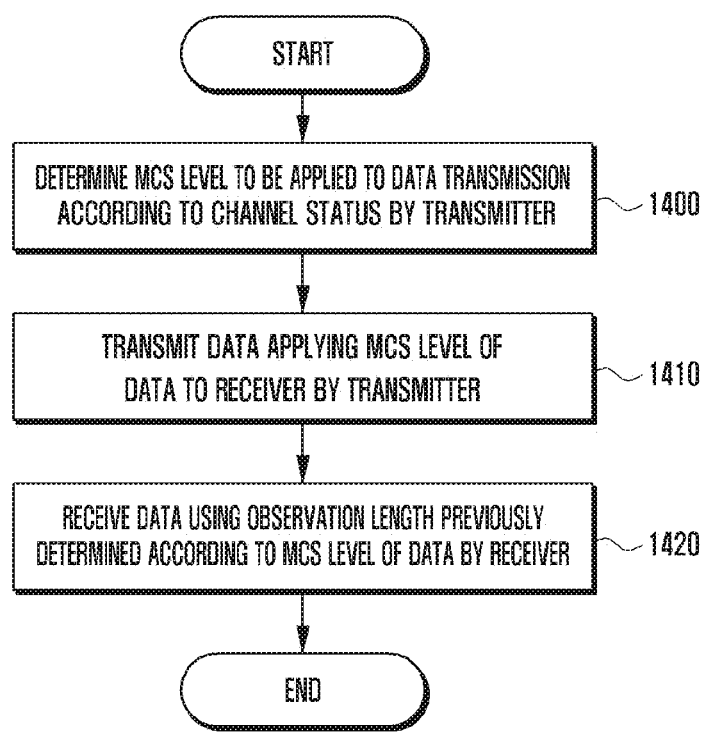
FIG. 14 illustrates another example of an operation scheme of a transceiver including an equalizer supporting a variable observation length according to embodiments of the present disclosure.

FIG. 14 illustrates another example of an operation scheme of a transceiver including an equalizer supporting a variable observation length.

Referring to FIG. 14, a transmitter determines an MCS level to be applied to data transmission according to a channel status in step 1400. In this event, the channel status can be in an MCS level to be applied according to an SNR value, an SINR value, or a channel status, and an observation length to be applied by a receiver according to an MCS level applied to the data transmission is previously determined. The transmitter transmits data to the receiver by applying the determined MCS level in step 1410. The receiver receives the data using the observation length previously determined according to the MCS level in step 1420. Since a communication performance is converged in a high SNR situation, a reception performance is enhanced when an observation length of the receiver sequentially increases to compensate for a performance in a high SNR section, but the observation length of the receiver cannot be lengthened any more when there is no room to further increase the complexity in the receiver.

TABLE 3

| MCS index | Modulation order | Coding rate | Observation length | Reception filter |
|---|---|---|---|---|
| 0 | QPSK | 1/2 | N | $P_{R, 0, 0}$ |
| 1 | 16QAM | 1/2 | 2N | $[P_{R,1,-1}, P_{R, 1, 0}]$ |
| 2 | 64QAM | 1/2 | 3N | $[P_{R, 2, -1}, P_{R, 2, 0}, P_{R, 2, 1}]$ |
| 3 | 64QAM | 5/6 | 4N | $[P_{R, 3, -2} P_{R, 3, -1} P_{R, 3, 0} P_{R, 3, 1}]$ |

Table 3 is an example of an operation scheme in which an observation length is previously determined according to an MCS level in a transceiver including an equalizer supporting a variable observation length. A transmitter determines the MCS level according to a channel status, and a receiver receives data by applying the previously determined observation length and a reception filter. In the reception filter P_R, j, k, j refers to a filter length or an MCS index, and k refers to an index value of a reception signal vector when a reception signal vector (hereinafter, a reference reception signal vector) corresponding to a data symbol acquired through filtering of the filtered reception signal vector is 0. When k=0, this implies that k is fixed to 0 when i=0 from the start point of a decoded symbol. Therefore, when i=1, 0 among the values of k refers to a reception filter for a reference reception signal vector, −1 refers to a reception vector having a length of N of a section of (−N to 0) before a reference reception signal vector start point, and 1 refers to a reception filter for a reception signal vector having a length of N of a section of (N+1 to 2N) after a reference reception signal vector start point.

Figure 15:
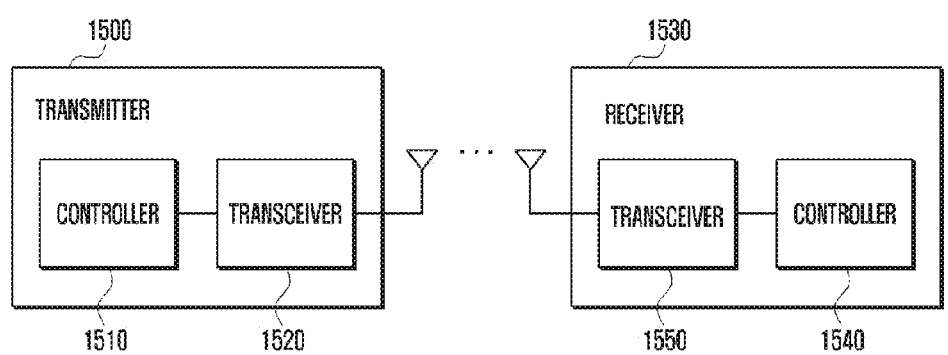
FIG. 15 is a block diagram illustrating an apparatus which can perform the present disclosure.

FIG. 15 is a block diagram illustrating an apparatus which can perform the present disclosure.

Referring to FIG. 15, a transmitter 1500 includes a controller 1510 and a transceiver 1520. The transceiver transmits and receives a signal to and from a receiver, and the controller makes a control to transmit an indicator for a Modulation and Coding Scheme (MCS) level based on a channel state to the receiver, and to transmit a signal applying the MCS level to the receiver. Further, the controller makes a control to determine whether the MCS level to be applied to a signal to be transmitted to the receiver is raised based on the channel state and a state of the receiver, and transmit a signal applying the raised MCS level to the receiver.

A receiver 1530 includes a controller 1540 and a transceiver 1550. The transceiver transmits and receives a signal to and from a transmitter, and the controller makes a control to receive the signal transmitted by the transmitter by applying a variable observation length. Specifically, the controller fast Fourier transforms a reception vector included in the signal, equalizes the fast Fourier transformed reception vector by a 1-tap zero forcing equalizer, and applies, to a reception vector, a reception filter based on an observation length determined on the basis of the channel status and an indicator transmitted by the transmitter.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of receiving a signal that is non-orthogonal by a receiver in a filter bank multicarrier system, the method comprising:
   receiving the signal transmitted by a transmitter, wherein the signal includes at least one symbol;
   identifying an observation length based on at least one of information from the transmitter and a channel state, wherein the observation length is variable; and
   estimating the at least one symbol of the signal by applying the observation length to the signal.

2. The method of claim 1, wherein the information is transmitted from the transmitter and includes an indicator associated with the observation length.

3. The method of claim 1, wherein the estimating the at least one symbol of the signal further comprises:
   performing fast Fourier transform on reception vectors contained in the signal;
   equalizing the fast Fourier transformed reception vectors by a 1-tap zero forcing equalizer; and
   applying a reception filter based on the observation length to the equalized fast Fourier transformed reception vectors.

4. The method of claim 3, wherein the reception filter is applied to equalized signals, a number of the equalized signals being equal to a number obtained by dividing the observation length by lengths of the reception vectors.

5. The method of claim 4, wherein the equalized signals are generated based on the reception signal vectors, a number of the reception signal vectors being spaced apart therefrom by an overlapping factor L.

6. A receiver for receiving a signal, which is non-orthogonal, in a filter bank multicarrier system, the receiver comprising:
   a transceiver configured to transmit and receive signals; and
   a controller configured to control to receive the signal transmitted by a transmitter, wherein the signal includes at least one symbol;
   identify an observation length based on at least one of information from the transmitter and a channel state, wherein the observation length is variable; and
   estimate the at least one symbol of the signal by applying the observation length to the signal.

7. The receiver of claim 6, wherein the information is transmitted from the transmitter and includes an indicator associated with the observation length.

8. The receiver of claim 6, wherein the controller is further confiugred to perform fast Fourier transform on reception vectors included in the signal, to equalize the fast Fourier transformed reception vectors by a 1-tap zero forcing equalizer, and to apply a reception filter based on the observation length to the equalized fast Fourier transformed reception vectors.

9. The receiver of claim 8, wherein reception filter is applied to equalized signals, a number of the equalized signals being equal to a number obtained by dividing the observation length by lengths of the reception vectors.

10. The receiver of claim 9, wherein the equalized signals are generated based on the reception signal vectors, a number of the reception signal vectors being spaced apart therefrom by an overlapping factor L.

* * * * *